United States Patent [19]

Schafer

[11] 4,039,473

[45] Aug. 2, 1977

[54] ACTIVE CARBON BY POTASSIUM ION EXCHANGE AND LEACHING OF CARBONACEOUS MATERIAL

[75] Inventor: Harry Neil Scott Schafer, Sydney, Australia

[73] Assignee: Commonwealth Scientific and Industrial Research Organization, Campbell, Australia

[21] Appl. No.: 668,004

[22] Filed: Mar. 18, 1976

[30] Foreign Application Priority Data

Mar. 18, 1975 Australia ............................ 0943/75

[51] Int. Cl.$^2$ ...................... C01B 31/16; C01B 31/12; C01B 31/10
[52] U.S. Cl. ................................ 252/425; 423/449; 423/460
[58] Field of Search ............... 252/425, 447; 423/449, 423/445; 264/29

[56] References Cited

U.S. PATENT DOCUMENTS

| | | | |
|---|---|---|---|
| 2,040,931 | 5/1936 | Fuchs | 252/423 |
| 2,998,375 | 8/1961 | Peterson et al. | 423/449 |
| 3,764,561 | 10/1973 | Nishino et al. | 252/447 |
| 3,817,874 | 6/1974 | Wennenberg et al. | 252/425 |

FOREIGN PATENT DOCUMENTS

| | | | |
|---|---|---|---|
| 45-28301 | 9/1970 | Japan | 252/425 |
| 55,905 | 11/1968 | Poland | 252/444 |
| 1,086,864 | 11/1967 | United Kingdom | 252/421 |

*Primary Examiner*—Patrick P. Garvin
*Assistant Examiner*—P. E. Konopka
*Attorney, Agent, or Firm*—Sughrue, Rothwell, Mion, Zinn and Macpeak

[57] ABSTRACT

A high yield active carbon is obtained from brown coal, lignite and similar carbonaceous materials. The brown coal is converted into a potassium-coal by reaction with an aqueous solution containing potassium ions; the potassium-coal is carbonized (pyrolysed) and the char so produced is leached to remove the bound potassium ions. The potassium-coal can be tabletted or extruded prior to the carbonization. Surface areas of up to 1500 m$^2$/g have been observed in the product. Additional activity can be achieved by subjecting the product to a conventional activation process.

10 Claims, No Drawings ced. Before the pyrolysis, the potassium-coal may be tablet-

ACTIVE CARBON BY POTASSIUM ION EXCHANGE AND LEACHING OF CARBONACEOUS MATERIAL

This invention concerns the production of active carbon from brown coal and like carbonaceous materials (i.e. those possessing carboxylic acid groups as for brown coal and lignite).

A summary of the properties and problems associated with the use of brown coal has been given in the specification of our U.S. patent application Ser. No. 569,643. That specification includes a description of a technique for forming low ash carbon from a carbonaceous material and activation by the conventional approach of reacting with oxygen, carbon dioxide or steam. These conventional methods of activation consume a considerable proportion of the carbon during the activation.

An objective of the present invention is to form an active carbon material directly from brown coal and like carbonaceous materials in high yield, and without necessarily performing conventional activation.

Basically, this objective is achieved by forming the potassium salt of the coal (henceforth referred to as "potassium-coal"), carbonising it, then removing the potassium cations from the char product.

According to the present invention, a process for producing an active carbon from brown coal or like carbonaceous material comprises the steps of:
 a. forming a potassium-coal by contacting the brown coal with an aqueous solution of at least one potassium compound,
 b. pyrolysing the potassium-coal, and
 c. leaching the char so obtained to remove the potassium cation therefrom.

It may, in some instances be advantageous to effect a pre-treatment of the coal with an acid to remove substantially all the naturally occurring cations organically bound to the coal, thereby forming a demineralised coal which can be contacted with an aqueous solution of a potassium compound to effect step (a) of the above-defined method. For some brown coals, however, particularly those low in mineral content, the raw coal can be treated directly with an aqueous solution of potassium compounds.

The potassium-coal may be tabletted or extruded from a paste prior to the pyrolysis (or carbonisation as this step is sometimes called), which may be effected at any suitable carbonisation temperature. The pyrolysed product in such instances is hard, regularly shaped tablets or pellets.

The pyrolysed product may, if a highly active carbon is required, be subsequently treated with oxygen, carbon dioxide or steam to enhance the active nature that would otherwise be obtained.

The leaching of the potassium ions from the char may be effected with hot water or, more efficiently, an acid solution.

In more detail, in one form of the present invention, the coal or other carbonaceous material, in particulate form, is first treated with hydrochloric acid to remove cations bound to the carboxylic acid groups of the coal by substitution with the hydrogen ion of the hydrochloric acid. When the product of this acid treatment (generally termed a demineralised coal or acid-form coal) is reacted with an aqueous solution of at least one potassium salt, it forms a substituted coal (again by an ion exchange process) known as potassium-coal. Normally, this reaction will be carried out at ambient temperature. Typical potassium salts used for this treatment are potassium chloride and potassium acetate.

The pH of the solution used to form the potassium-coal should be about 8.3, and potassium hydroxide or ammonia solution may be added, as required, to keep the pH at this value during the reaction of the demineralised coal and the aqueous solution of the potassium salt or salts. If the pH falls below 8.3, there will be an incomplete exchange of the cations on the carboxylic acid groups. This is not necessarily disadvantageous since partial formation of potassium coal can be used to control the activity of the final product of the treatment. Equally, a pH value in excess of 8.3, which will cause exchange in some of the phenolic groups, is not detrimental to the activity of the final product. Another way of controlling the degree of cation substitution is to use less than the quantity of potassium solution necessary for stoichiometric conditions to apply. In general, an amount of potassium solution in excess of the stoichiometric requirement will be used.

The potassium-coal is then recovered from the solution by filtration or centrifuging, washed and pyrolysed. Before the pyrolysis, the potassium-coal may be tabletted, in which case the char produced by the pyrolysis step will be in the form of hard, compact tablets, significantly reduced in volume by the carbonisation.

An alternative method of producing the potassium-coal is mixing particulate raw brown coal with a relatively small amount of an aqueous solution of potassium hydroxide to form a paste having a doughlike consistency. The cation exchange proceeds as described above and the product potassium-coal paste may be extruded directly to form, typically, regular pellets, thus avoiding the need to filter or centrifuge. Pyrolysis of these pellets forms hard, regularly shaped char pellets, significantly reduced in volume by the carbonisation.

Pyrolysis of the potassium-coal is typically carried out in a stream of nitrogen by heating the coal slowly to a temperature of about 900° C.

The carbonised potassium-coal material so produced — in powder, tablet or in granular form - has a surface area of about 20 m$^2$/g. However, when the potassium ions are leached from the potassium-coal char, using either hot water or an acid to remove the cations, it has a surface area (measured by CO$_2$ adsorption at 0° C) of between 1100 m$^2$/g and 1500 m$^2$/g. Conventional active carbons have a surface area ranging from about 800 m$^2$/g for low grade active materials to about 1500 m$^2$/g for first grade material.

As noted above, the reactivity of the final product can be enhanced by conventional activation techniques after the pyrolysis step. Typically such additional activation procedures will be carried out at a temperature of about 800° C. The highly active carbon produced by such "enhancing" procedure, it should be noted, will still be a high yield carbon material. It will generally be unnecessary to burn off more than about 25 per cent of the carbon to significantly enhance the activity of the product.

A feature of this treatment of brown coal is that corresponding increases in surface area are not achieved if (a) the formation of potassium-coal is omitted and the acid-form coal is carbonised direct, or (b) other alkali metal modified coals are produced instead of the potassium-coal. The results of one series of experiments, illustrating the present invention and the "failure" of such, at first sight chemically similar, processes are summarised in Table 1. In fact, for cases other than potassium-form coal, the characteristics of the chars produced are such that the substituted cations cannot be completely removed by leaching. For example, it has been established that leaching of the char from the potassium-coal, using water only, effectively removes the potassium cation, but that leaching, even with an acid, does not completely remove other cations such as calcium and magnesium from the chars produced from the calcium- and magnesium-coal. This behavior does not reflect the relative ionic radii and shows that the potassium exerts a particular effect on the characteristics of the char as it is formed with respect to accessibility to pores as well as to the surface area.

Table 1 lists the surface areas (measured by $CO_2$ adsorption at 0° C for a range of samples prepared from −72 mesh (B.S.) Yallourn brown coal. The sodium- and magnesium-coals were prepared in the same manner as the potassium-coal. The carbonization was carried out in nitrogen at 900° C, and the yield of all the chars when corrected to a cation free basis was approximately 43%.

TABLE 1

| Sample | Surface area of chars in $m^2/g$ | |
|---|---|---|
| | Cation present | Cation removed |
| Raw brown coal | 700 | |
| Acid-form coal | 870 | 860* |
| Magnesium-coal | 570 | 210 |
| Sodium-coal | 310 | 690 |
| Potassium-coal (1st sample) | 20 | 1180 |
| Potassium-coal (2nd sample) | 20 | 1220 |
| Acid-form coal tablets | N.D. | 950* |
| Potassium-coal tablets | N.D. | 1270** |

*Value after acid extraction and drying; no cation to be removed
**Hot water treatment only to remove cation.

The following examples will further illustrate the present invention.

EXAMPLE 1

A 20g sample of acid-form Yallourn brown coal (previously prepared from raw brown coal by heating with 5N hydrochloric acid, filtering, washing with distilled water and air drying) was shaken overnight with 15g of potassium chloride and 3g of potassium hydroxide in 200 ml of distilled water. The pH was then adjusted to approximately 8.5 by the further addition of some potassium hydroxide solution. The coal suspension was filtered, and the potassium-coal washed with distilled water (total 100 ml) and then air dried. The potassium-coal was then heated to 900° C in a stream of nitrogen and maintained at this temperature overnight. After cooling to ambient temperature, a portion of the char was leached with distilled water by heating to boil and simmering for 20 minutes. The extracted char was recovered by filtration, washed with distilled water and dried at 110° C in nitrogen prior to surface area measurement. The yield of extracted char was 43% (calculated on acid-form coal basis) and the char had a surface area of 1200 $m^2/g$, which compares with 44% (also calculated on acid-form coal basis) and 860 $m^2/g$, respectively, for the leached char from the acid-form coal.

EXAMPLE 2

75 ml of 1N potassium hydroxide solution were gradually added to 20g of Yallourn raw brown coal, with mixing to give a dough-like mass. This mixture was then extruded to give long cylindrical pieces. After air-drying the now compacted and hard coal was broken into small lengths and heated in a stream of nitrogen to 900° C as in Example 1. After cooling, the char was leached by boiling in distilled water. The solution was removed by decantation and the char leached with 0.5N hydrochloric acid by heating to boiling. The char obtained in the 37% yield had a surface area of 1340 $m^2/g$, an iodine absorption number of 974, and a benzene index of 27.2.

EXAMPLE 3

A 20g sample of the same Yallourn coal as in Example 2 was extracted with 2N hydrochloric acid by heating to the boil; the coal was filtered and washed on a Buchner funnel and most of the water removed by continued suction. To this acid-form coal, 70 ml of 1N potassium hydroxide were gradually added with mixing to give a dough-like mass. After extrusion and carbonising as described in Example 2, the acid-washed char obtained had a surface area of 1500 $m^2/g$.

EXAMPLE 4

A 50g sample of Loy Yang acid-form coal was shaken with a solution containing 17.5g potassium chloride and .5g potassium hydroxide in 250 ml distilled water. The pH was checked at intervals and adjusted to pH 8.3 by addition of small amounts of potassium hydroxide solution. The coal was recovered by filtration and washed with distilled water. After air drying, it was pyrolysed in nitrogen at 900° C, as previously described, and the resultant char was extracted with hot water. The product char had a surface area of 1100 $m^2/g$. A char prepared directly from the acid-form Loy Yang coal (i.e., without the potassium-coal formation) had a surface area of only 860 $m^2/g$.

EXAMPLE 5

A sample of raw Yallourn brown coal was compressed into tablet form and carbonised in nitrogen at 900° C. The resultant char was sized to −7 +14 mesh (B.S.) and a portion of the sized char was activated by heating in steam at 800° C. A burn-off of 25.5 per cent, calculated on the dry char used, was achieved during the activation. Another sample of the same Yallourn brown coal was treated with potassium hydroxide, extruded and carbonised as in Example 2. The product char was washed in water and acid and a portion activated by heating in steam at 800° C. A burn-off of 23.2 per cent was achieved during activation. Samples of the original chars and the activated chars were ground to −350 mesh (B.S.) and their iodine absorption numbers determined. These values, which clearly demonstrate the enhanced activity of the combined KOH treated and steam activated product, are displayed in Table 2.

Table 2

| Origin of Char | Iodine Absorption Number | |
|---|---|---|
| | Unactivated | Steam activated |
| Yallourn raw coal | 200 | 530 |
| Yallourn raw coal, KOH treated | 975 | 1280 |

I claim:

1. A process for producing an active carbon from carbonaceous material selected from the group consisting of brown coal and lignite comprising the sequential steps of:

a. forming a potassium carbonaceous material by contacting the carbonaceous material with an aqueous solution of at least one ionizable potassium compound,
b. pyrolysing the potassium-carbonaceous material to form a char, and
c. leaching the char so obtained to remove the potassium cations therefrom.

2. A process as defined in claim 1, wherein
a. the aqueous solution contains one or more compounds selected from the group consisting of potassium hydroxide, potassium chloride and potassium acetate, and
b. the pH of the aqueous solution is maintained at a value of about 8.3.

3. A process as defined in claim 1, wherein the carbonaceous material is first subjected to a pre-treatment comprising contacting the carbonaceous material with hydrochloric acid to effect substitution of the cations bound to the carboxylic acid groups of the carbonaceous material with the hydrogen ion of the hydrochloric acid.

4. A process as defined in claim 1, in which the potassium-carbonaceous material is separated from the aqueous solution and tabletted prior to the pyrolysis step.

5. A process as defined in claim 1, wherein the aqueous solution is of potassium hydroxide and the potassium-carbonaceous material is formed as a paste of dough-like consistency and is extruded prior to the pyrolysis step.

6. A process as defined in claim 1, wherein the product char is subjected to a conventional activation treatment to enhance its activity.

7. A process as defined in claim 4, wherein the product char is subjected to a conventional activation treatment to enhance its activity.

8. A process as defined in claim 5, wherein the product char is subjected to a conventional activation treatment to enhance its activity.

9. A process as defined in claim 7, in which the conventional activation treatment comprises reacting the char with steam at a temperature of about 800° C.

10. A process as defined in claim 8, in which the conventional activation treatment comprises reacting the char with steam at a temperature of about 800° C.

* * * * *